US008591848B2

(12) United States Patent
Sun et al.

(10) Patent No.: US 8,591,848 B2
(45) Date of Patent: Nov. 26, 2013

(54) SELECTIVE CATALYTIC $NO_x$ REDUCTION PROCESS AND CONTROL SYSTEM

(75) Inventors: William H. Sun, Lisle, IL (US); Paul G. Carmignani, Naperville, IL (US); John M. Boyle, Oak Park, IL (US)

(73) Assignee: Fuel Tech, Inc., Warrenville, IL (US)

( * ) Notice: Subject to any disclaimer, the term of this patent is extended or adjusted under 35 U.S.C. 154(b) by 431 days.

(21) Appl. No.: 12/266,373

(22) Filed: Nov. 6, 2008

(65) Prior Publication Data

US 2010/0061907 A1    Mar. 11, 2010

Related U.S. Application Data

(60) Provisional application No. 60/986,917, filed on Nov. 9, 2007.

(51) Int. Cl.
*B01D 53/56* (2006.01)
*B01D 53/58* (2006.01)
*C01B 21/00* (2006.01)

(52) U.S. Cl.
USPC ......... 423/235; 423/238; 423/239.1; 423/351

(58) Field of Classification Search
None
See application file for complete search history.

(56) References Cited

U.S. PATENT DOCUMENTS

| 5,047,220 A * | 9/1991 | Polcer ................. 423/239.1 |
| 5,681,158 A * | 10/1997 | Knapp ................. 431/5 |
| 7,622,093 B2 * | 11/2009 | Arrol et al. ............ 423/210 |
| 2004/0057889 A1 * | 3/2004 | Buzanowski ........... 423/235 |
| 2004/0128982 A1 * | 7/2004 | Patchett et al. .......... 60/274 |
| 2006/0101811 A1 * | 5/2006 | Linna et al. ............ 60/286 |
| 2006/0204417 A1 * | 9/2006 | Rini et al. ............. 423/210 |
| 2006/0213197 A1 * | 9/2006 | Caro et al. ............. 60/685 |
| 2007/0101703 A1 * | 5/2007 | Kanaya et al. .......... 60/286 |
| 2007/0142975 A1 * | 6/2007 | Piche ................... 700/286 |
| 2008/0066453 A1 * | 3/2008 | Oberski et al. .......... 60/286 |
| 2008/0116054 A1 * | 5/2008 | Leach et al. ........... 204/157.3 |
| 2009/0019835 A1 * | 1/2009 | Dingle ................. 60/282 |

* cited by examiner

*Primary Examiner* — Melvin C Mayes
*Assistant Examiner* — Sheng H Davis
(74) *Attorney, Agent, or Firm* — Thaddius J. Carvis

(57) ABSTRACT

Disclosed is a system which enables the efficient utilization of urea for selective catalytic reduction (SCR) of $NO_x$ by gasifying it and feeding it to a plurality of selective catalytic reduction units associated with a plurality of gas turbines. The invention enables feeding a gasified product of the urea with the ability to fully control separate SCR units without excessive reagent usage or loss of pollution control effectiveness. Controllers determine the amount of reagent required for each turbine to control $NO_x$ emissions and then mixes the gasified urea with the correct amount of carrier gas for efficient operation of each separate SCR unit despite the demand variation between the turbines. In this manner the gasification unit can be properly controlled to provide urea on demand without the need for storing large inventories of ammonia-containing gasses to correct for fluctuations in demand.

4 Claims, 2 Drawing Sheets

SELECTIVE CATALYTIC $NO_x$ REDUCTION PROCESS AND CONTROL SYSTEM

RELATED APPLICATION

This application is a continuation of copending U.S. Provisional Application Ser. No. 60/986,917, filed Nov. 9, 2007, the disclosure of which is incorporated herein in its entirety.

FIELD OF THE INVENTION

The invention relates generally to the efficient utilization of urea for selective catalytic reduction (SCR) of $NO_x$, and more particularly to feeding a gasified product of the urea to feed multiple turbine power units from a single unit, which converts urea to ammonia-containing SCR reagent yet maintains the ability to fully control separate SCR units without excessive reagent usage or loss of pollution control effectiveness.

BACKGROUND OF THE INVENTION

The use of turbines to generate power is economical in many situations where more conventional powerplants cannot be contemplated. To their great credit, they generally operate with minimal generation of $NO_x$ and can utilize fuels, such as digester and landfill gases. However, they do generate regulatory significant amounts of $NO_x$, and efforts are made to reduce emissions to even lower levels.

Digester and landfill gases are gaseous by-products, principally comprised of methane and carbon dioxide, of anaerobic decomposition of organic materials from sewage treatment or landfills. These are not clean fuels according to criteria that utilities normally consider. Trace quantities of offensive compounds are typically found in the gases and often include hydrogen sulfide, ammonia and acid gas forming compounds. In addition, some compounds present in the gas and are known to clog $NO_x$ reduction catalysts and shorten the life of the turbines. The net effect for operators is that utilization of this low-cost fuel can present additional costs in terms of shortened turbine life, corroded ductwork and fouled catalysts.

Unless these costs can be recovered by taking good advantage of the energy value of these fuels, the environment will suffer and their energy value will likely be replaced with imported petroleum. It is, therefore, advantageous that all costs be recovered by the facility operators, burned in combustion devices such as turbines to either generate electricity or directly power equipment, and treated by suitable $NO_x$ reduction technology, the best of which is SCR if it can be done effectively without storing dangerous ammonia in a system which is as flexible as the power grid is to energy demand.

SCR has been proven to be highly effective at $NO_x$ reduction, and SCR units can generally be scaled to the size required for turbines. However, SCR units typically require the use of ammonia as a reducing reagent, and it is a common problem that ammonia is difficult and dangerous to store, especially in populated areas. Thus, the use of ammonia generators such as described in U.S. Pat. No. 7,090,810 to Sun, et al., and U.S. Pat. No. 6,077,491 to Cooper, et al., are often required, but their control for multiple turbine units has not been addressed and can be more costly or difficult than economics may permit in some installations, such as turbines for use with digester and landfill gases.

The digester and landfill gases, which have more traditionally been burned by a flare because of the low quality of the gases, can create costs that are difficult to recover. For these gases, the problem of economics is especially great. Installations requiring more than one turbine cannot presently benefit from a single urea-based ammonia SCR plant. Unfortunately, it has been seen that utilization of a single urea conversion unit for each turbine is the most practical approach.

However, because the demand on the turbines for power fluctuates over time—with daily and seasonal fluctuations—single ammonia generators have not been practical. SCR units typically employ ammonia injection grids (AIGs), which are essentially arrays of distribution pipes with holes arranged through which the ammonia is preferably ejected with a carrier gas to provide sufficient momentum for the gas at each location and thereby achieve uniform distribution of ammonia. When demand is low, immediate decrease of ammonia to one SCR unit for one turbine, will create a temporary excess of ammonia for the others. Without employing storage tanks, which is to avoided for ammonia safety reasons, there is currently no good way to accommodate the fluctuations. Distribution will be adversely affected or excess ammonia will be supplied and result in ammonia slip.

There is a present need for a process, apparatus and system for efficient utilization of urea for selective catalytic reduction (SCR) of $NO_x$, and more particularly for feeding a gasified product of the urea to multiple turbine power units from a single urea gasification unit.

There is a particular need for such a system which converts urea to ammonia, yet maintains the ability to fully control separate SCR units without excessive reagent usage or loss of pollution control effectiveness.

SUMMARY OF THE INVENTION

The present invention provides a process for reducing the concentration of nitrogen oxides in combustion gases from a plurality of turbines or other combustors, each of which has an associated selective catalytic $NO_x$ reduction catalyst effective for utilizing gasified urea, the process comprising: heating aqueous urea at conditions of temperature and pressure for a time effective to gasify the urea and water by mixing the aqueous urea with a heated gas stream in amounts relative to the amounts of urea and water to produce a first gasified reductant stream comprising a predetermined mass and concentration of ammonia; monitoring the demand for urea at each of the plurality of turbines; feeding the first gasified reductant stream to each turbine at a rate sufficient to supply gasified reductant to supply the monitored demand to the selective catalytic $NO_x$ reduction catalyst associated with each turbine; determining an amount of carrier gas needed to achieve a predetermined degree of mixing of the gasified reagent with combustion gases generated at each turbine; based on this determination, admixing a determined amount of carrier gas with the first gasified reductant stream to provide a catalyst feed stream associated with each turbine; and at each turbine, introducing an associated catalyst feed stream by means of an ammonia injection grid to the combustion gases upstream of the catalyst under conditions effective to reduce the concentration of NOx in the effluent from each turbine.

The invention also comprises the system and apparatus described and illustrated for accomplishing the process as described and reasonable variations of it.

DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention. As shown throughout the drawings, like reference numerals designate like or corresponding parts.

DETAILED DESCRIPTION OF THE INVENTION

Figure 1:
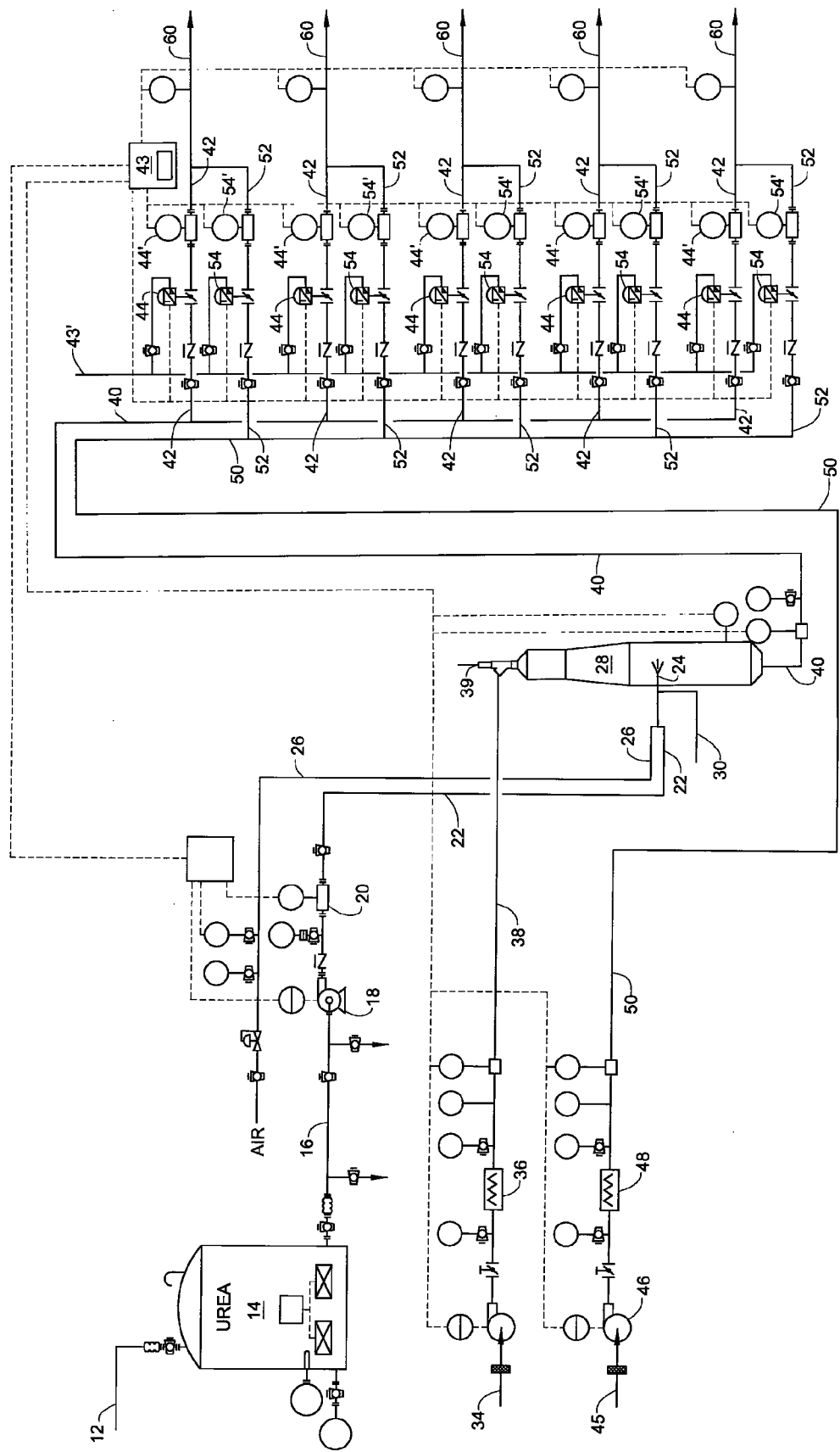
FIG. 1 is a schematic flow diagram of a preferred embodiment of the process and system of the invention.

In describing the present invention, reference is made to the drawings, wherein there is seen a preferred embodiment shown schematically in FIG. 1. The drawing and the process it represents will be described briefly below, without undue recitation of sensors, pumps, indicators, transmitters, valves, pumps, and the like which are so well known to those skilled in engineering systems of this type. Various labels are used in the drawings to have the meanings as follows: TE=temperature element/sensor, LT=level transmitter/sensor, VFD=variable frequency drive, SC=speed control, PI=pressure indicator/sensor, TI=temperature indicator/sensor, FT=flow transmitter, I/P=current to pressure transducer, FIT=flow indicating transmitter, M=flowmeter, PLC=programmable logic controller.

With reference to FIG. 1, a feed line 12 leads to urea tank 14 to maintain a sufficient supply of an aqueous solution of urea or like chemical as described in U.S. Pat. No. 7,090,810, the disclosure of which is incorporated herein by reference. The process is effective with urea, but can utilize other $NO_x$-reducing reagents capable of generating a reactant gas containing ammonia upon heating. As will be clear from the following, when certain of these reagents are gasified, the reactant gas will also contain HNCO which reacts with water to convert to ammonia and carbon dioxide. It is an advantage of the invention that this can be easily achieved without prehydrolysis of the $NO_x$-reducing reagent which has the attendant risk of plugging nozzles and other equipment. By the term "gasification" we mean that substantially all of the urea is converted into a gas, leaving no significant dissolved or free solids or liquid to contact with and foul SCR catalysts.

The term "urea" is meant to include the reagents that are equivalent to urea in the sense that they form ammonia and HNCO when heated, whether or not they contain large amounts of the pure chemical urea in the form introduced into the combustion gases; however, the reagents that are equivalent to urea typically contain measurable quantities of urea in their commercial forms and thus comprise urea. Among the $NO_x$-reducing reagents that can be gasified are those that comprise a member selected from the group consisting of: ammelide; ammeline; ammonium carbonate; ammonium bicarbonate; ammonium carbamate; ammonium cyanate; ammonium salts of inorganic acids, including sulfuric acid and phosphoric acid; ammonium salts of organic acids, including formic and acetic acid; biuret; triuret, cyanuric acid; isocyanic acid; urea formaldehyde; melamine; tricyanourea and mixtures of any number of these. Yet other $NO_x$-reducing reagents are available that do not form HNCO, but decompose to a mixture of gases including hydrocarbons. Among this group are various amines and their salts (especially their carbonates), including guanidine, guanidine carbonate, methyl amine carbonate, ethyl amine carbonate, dimethyl amine carbonate, hexamethylamine; hexamethylamine carbonate; and byproduct wastes containing urea from a chemical process. Amines with higher alkyls can be employed to the extent that the hydrocarbon components released do not interfere with the $NO_x$-reduction reaction. The term "urea" is thus meant to encompass urea in all of its commercial and equivalent forms. Typically, commercial forms of urea will consist essentially of urea, containing 95% or more urea by weight. This relatively pure form of urea is preferred and has several advantages in the process of the invention. It is preferably supplied to tank 14 at a concentration of from about 10 to about 50%, with about 30 to about 35%.

A level sensor and feed pump arrangement assure that sufficient urea solution will always be present in the tank 14 to meet programmed demand. From the tank 14, which can be heated to facilitate low temperature operation, the urea solution flows via line 16 assisted by metering pump 18 and flow monitor 20 to line 22 for introduction through injector nozzle 24, which with the aid of air from line 26, atomizes the aqueous urea solution for its gasification in gasification chamber 28. The gasification of the urea is facilitated with heated air from line 34 which passes it to heater 36 and line 38 and auxiliary heater 39 for supply to chamber 28. In chamber 28, the aqueous urea solution is heated at conditions of temperature (e.g., from about 175° to about 650° C.) and pressure (e.g., at near atmospheric, say from about 0.5 to about 1.5 atm) for a time effective to gasify the urea and water by mixing the aqueous urea with the heated gas stream from line 38 in amounts relative to the amounts of urea and water to produce a first gasified reductant stream comprising a predetermined concentration of ammonia. A typical gas stream will contain from about 0.5% to about 5% by weight ammonia. In some embodiments, an air line 30 can be employed to aspirate the nozzle 24 during cleaning. The gasified urea solution, also called gasified reductant, is withdrawn from chamber 28 via line 40 for distribution as a first gasified reductant stream to supply lines 42 serving the SCR units associated with each of the turbines as will be describe more below.

The demand for urea is monitored by sensors at each of the plurality of turbines by sensing at least one control parameter of the combustion gases from a turbine which is indicative of the $NO_x$ in the combustion gases and determining the demand by control programmable logic controller 43 or other like device. The controller can be feed forward with or without feedback. The first gasified reductant stream is fed to each turbine via individual lines 42, utilizing control valves and flow monitors shown generally as 44 and 44', respectively, at a rate sufficient to supply gasified reductant to supply the monitored demand to the selective catalytic $NO_x$ reduction catalyst associated with each turbine. Because the turbines will have different requirements for $NO_x$ reduction due to their loads, fuels supplied or other factors, and because the gasified reductant must be uniformly dispersed within the combustion gases, normal ammonia injection grids, AIGs, will not provide the desired distribution with effective reagent utilization.

Figure 2:
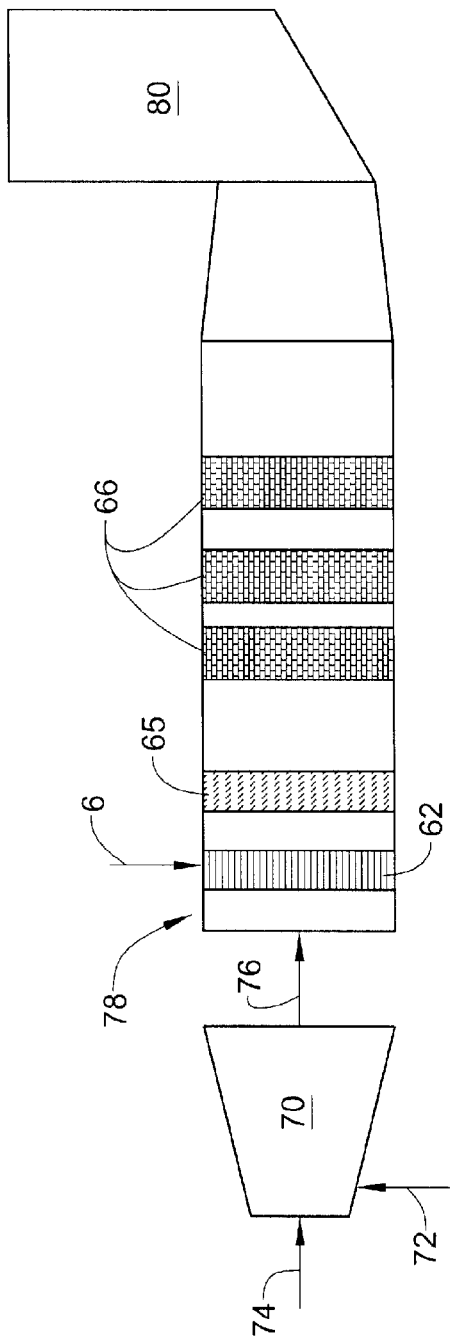
FIG. 2 is a schematic representation of a single turbine with an SCR unit supplied with gasified reductant in accord with the invention.

FIG. 2 is a schematic representation of a single turbine with an SCR unit supplied with gasified reductant in accord with the invention. The turbine 70 is fed fuel from line 72 and air from line 74 and generates combustion gases 76 which pass into SCR unit 78 where they are treated according to the invention and then exhausted to stack 80.

Figure 3:
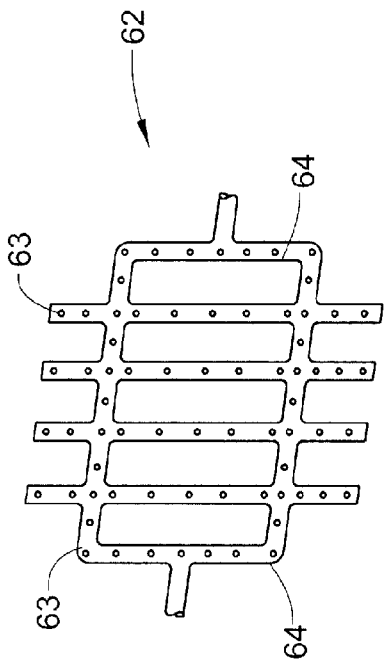
FIG. 3 is a schematic diagram on one form of ammonia injection grid the operation of which in an SCR system that can be improved according to the invention.

FIG. 3 shows one form of AIG, ammonia injection grid 62, the operation of which in an SCR system that can be improved according to the invention. Such grids will generally have an array of pipes 63 with an array of holes 64 through which the gasified reagent is distributed to the combustion gases from the associated turbine. The SCR unit includes an AIG, ammonia injection grid, 62 fed gasified reagent via line 60.

An in-line mixing device 65 is typically provided for assuring good mixing of the gasified reagent with the combustion gases. Then, the gases are passed through a series of catalysts effective for selective catalytic reduction of $NO_x$ at the designed temperatures of the system at this point.

Referring again to FIG. 1, it can be seen that the gasified reagent is passed via line 40 to individual lines 42 to be mixed with a sufficient amount of carrier gas so that the correct dosing of gasified reagents can be utilized and mixed with sufficient carrier gas to achieve the correct mass flow rate and velocity profile for the reducing gas when introduced into the SCR unit 78 by means of an injection grid 62.

A separate supply system is provided for providing carrier gas to each individual turbine. FIG. 1 shows air introduced via line 45 and blower 46 to heater 48 and line 50. The rates of supply and degrees of heating can be controlled by appropriate sensors via controller 43 using instrument air 43' or equivalent. Because the load of one or more turbines may not be high enough to require sufficient ammonia that the flow through a feed line 42 maintains it at the proper temperature, it is important that heater 48 be employed to maintain the temperature of the gasified reagent in line 60.

To achieve the advantages of the invention, the controller 43 or other logic device will determine the amount of carrier gas needed to achieve a predetermined degree of mixing of the gasified reagent with combustion gases generated at each turbine. Then, based on this determination, a determined amount of carrier gas from supply line 50 and individual lines 52 is admixed with the first gasified reductant stream from lines 40, 42 to provide a catalyst feed stream associated with each turbine and which can be fed to the turbine via a line 60. Then, at each turbine 70, an associated catalyst feed stream 60 is introduced by means of an ammonia injection grid 62 to the combustion gases upstream of the catalyst 66 under conditions effective to reduce the concentration of NOx in the effluent from each turbine. Similarly as with supply of the first gasified reductant stream via individual lines 42, lines 52 can utilize control valves and flow monitors shown generally as 54 and 54', respectively to control the rate sufficient to supply a catalyst feed stream with the necessary mass and flow rate to each turbine.

It is an advantage of the invention that a gasified product of urea can be fed with the ability to fully control separate SCR units without excessive reagent usage or loss of pollution control effectiveness. The controller 43 can determine the amount of reagent required for each turbine to control $NO_x$ emissions and then direct mixing the gasified urea with the correct amount of carrier gas for efficient operation of each separate SCR unit despite the demand variation between the turbines. In this manner the gasification unit can be properly controlled to provide urea on demand without the need for storing large inventories of ammonia-containing gasses to correct for fluctuations in demand. While the description exemplifies turbines due to the special effectiveness and importance of the invention in that context, it will be apparent to those skilled in the art that its advantages can be extended to other types of combustors, including furnaces, boilers, engines, incinerators and the like. It is another advantage of the invention that the temperature of the gasified reagent in line 60 can be maintained at a sufficient temperature to prevent condensation or chemical reactions even when the load of one or more turbines may not be high enough for sufficient mass flow through a feed line 42.

The above description is for the purpose of teaching the person of ordinary skill in the art how to practice the invention. It is not intended to detail all of those obvious modifications and variations, which will become apparent to the skilled worker upon reading the description. It is intended, however, that all such obvious modifications and variations be included within the scope of the invention which is defined by the following claims. The claims are meant to cover the claimed components and steps in any sequence which is effective to meet the objectives there intended, unless the context specifically indicates the contrary.

What is claimed is:

1. A process for reducing the concentration of nitrogen oxides in combustion gases from a plurality of combustors, each of which has an associated selective catalytic NOx reduction catalyst effective for utilizing gasified urea while enabling control to provide urea on demand without the need for storing large inventories of ammonia-containing gases to accommodate fluctuations of demand seasonally and daily and between individual combustors, the process comprising:
   a. heating aqueous urea at conditions of temperature and pressure for a time effective to gasify the urea and water by mixing the aqueous urea with a heated gas stream in amounts relative to the amounts of urea and water to produce a first gasified reductant stream comprising a predetermined mass and concentration of ammonia;
   b. monitoring the demand for urea at each of the plurality of combustors;
   c. feeding the first gasified reductant stream to each turbine at a rate sufficient to supply gasified reductant to supply the monitored demand to the selective catalytic NOx reduction catalyst associated with each combustor;
   d. determining an amount of carrier gas needed to achieve a predetermined degree of mixing of the gasified reagent with combustion gases generated at each combustor;
   e. based on this determination, admixing a determined amount of carrier gas with the first gasified reductant stream to provide a catalyst feed stream associated with each combustor; and
   f. at each combustor, introducing an associated catalyst feed stream by means of an ammonia injection grid to the effluent upstream of the catalyst under conditions effective to reduce the concentration of NOx in the combustion gases from each combustor, whereby fluctuations of demand seasonally and daily and between individual combustors are accommodated without large inventories of ammonia-containing gases.

2. A process according to claim 1, wherein the urea is mixed with heated air in amounts relative to the amounts of urea and water to produce a first gasified reductant stream comprising from about 0.5% to about 5% by weight ammonia.

3. A process for reducing the concentration of nitrogen oxides in combustion gases from a plurality of turbines, each of which has an associated selective catalytic NOx reduction catalyst effective for utilizing gasified urea while enabling control to provide urea on demand without the need for storing large inventories of ammonia-containing gases to accommodate fluctuations of demand seasonally and daily and between individual turbines, the process comprising:
   a. heating aqueous urea at conditions of temperature and pressure for a time effective to gasify the urea and water by mixing the aqueous urea with a heated gas stream in amounts relative to the amounts of urea and water to produce a first gasified reductant stream comprising a predetermined mass and concentration of ammonia;

b. monitoring the demand for urea at each of the plurality of turbines;
c. feeding the first gasified reductant stream to each turbine at a rate sufficient to supply gasified reductant to supply the monitored demand to the selective catalytic NOx reduction catalyst associated with each turbine;
d. determining an amount of carrier gas needed to achieve a predetermined degree of mixing of the gasified reagent with combustion gases generated at each turbine;
e. based on this determination, admixing a determined amount of carrier gas with the first gasified reductant stream to provide a catalyst feed stream associated with each turbine; and
f. at each turbine, introducing an associated catalyst feed stream by means of an ammonia injection grid to the effluent upstream of the catalyst under conditions effective to reduce the concentration of NOx in the combustion gases from each turbine, whereby fluctuations of demand seasonally and daily and between individual turbines are accommodated without large inventories of ammonia-containing gases.

4. A process according to claim 3, wherein the urea is mixed with heated air in amounts relative to the amounts of urea and water to produce a first gasified reductant stream comprising from about 0.5% to about 5% by weight ammonia.

* * * * *